United States Patent
Yamamoto et al.

(10) Patent No.: US 6,525,882 B1
(45) Date of Patent: *Feb. 25, 2003

(54) HYDROPHILIC MIRROR AND METHOD OF PRODUCING THE SAME

(75) Inventors: Toru Yamamoto, Osaka (JP); Masahiro Hirata, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/460,970

(22) Filed: Dec. 15, 1999

(30) Foreign Application Priority Data

Dec. 18, 1998 (JP) .............................. 10-375959
Dec. 8, 1999 (JP) ............................. 11-348255

(51) Int. Cl.⁷ .............................................. G02B 1/10
(52) U.S. Cl. ..................... 359/584; 359/580; 359/586; 359/507; 359/509
(58) Field of Search ................................ 359/580, 584, 359/586, 588, 589, 350, 359, 360, 507, 509; 65/60.1, 60.2; 427/161, 162, 164

(56) References Cited

U.S. PATENT DOCUMENTS

| | | | |
|---|---|---|---|
| 2,519,722 A | | 8/1950 | Turner |
| 4,233,148 A | * | 11/1980 | Ramsey et al. ............. 204/291 |
| 4,457,587 A | * | 7/1984 | Katayama et al. .......... 359/883 |
| 4,661,381 A | | 4/1987 | Callies et al. ................ 427/255 |
| 5,153,054 A | | 10/1992 | Depauw et al. |
| 5,573,839 A | | 11/1996 | Beaufays et al. |
| 5,668,663 A | * | 9/1997 | Varaprasad et al. ......... 359/265 |
| 5,700,305 A | | 12/1997 | Lowe et al. |
| 5,751,484 A | | 5/1998 | Goodman et al. |
| 6,312,131 B1 | * | 11/2001 | Yamamoto et al. .......... 359/507 |

FOREIGN PATENT DOCUMENTS

| | | |
|---|---|---|
| DE | 2 268 509 A | 1/1994 |
| DE | 2 290 555 A | 1/1996 |
| EP | 456 488 | 11/1991 |
| EP | 0 546 470 A1 | 6/1993 |
| EP | 583 871 | 2/1994 |
| JP | 09-278431 | 10/1997 |
| JP | 09-295363 | 11/1997 |

* cited by examiner

Primary Examiner—Audrey Chang
(74) Attorney, Agent, or Firm—Sughrue Mion, PLLC

(57) ABSTRACT

A hydrophilic mirror comprising a glass substrate having on the main surface side thereof a layer having a refractive index $n_1$ at 550 nm, a layer having a refractive index $n_2$ at 550 nm, a tin oxide layer having a refractive index $n_3$ at 550 nm, and an overcoat in this order, the refractive indices $n_1$, $n_2$ and $n_3$ satisfying the relationship: $n_1 \geq n_3 > n_2$, and having a visible light reflectance of 70% or more.

16 Claims, 2 Drawing Sheets

HYDROPHILIC MIRROR AND METHOD OF PRODUCING THE SAME

FIELD OF THE INVENTION

This invention relates to a hydrophilic mirror and, more particularly, to a hydrophilic mirror having excellent properties of restoring hydrophilicity after cleaning.

BACKGROUND OF THE INVENTION

Mirrors generally have a highly reflective mental coating of silver, aluminum, etc., formed on thereon. A mirror using silver is produced by applying a solution of a silver salt to glass and conducting reduction reaction on the glass surface to form a silver coating. Because the silver coating itself is susceptible to oxidation and is also susceptible to corrosion, its durability is very weak. Therefore, a silvered glass which can withstand practical use as it is cannot be obtained and it is necessary to form a protective layer on the surface of the silver coating. Since the silver coating is also corroded by water seeping in from the edges, the edges of a silver mirror should also be protected. A silver mirror intended for use in a bathroom is usually subjected to special protection treatment. The protective layer uses an opaque agent in many cases so that the protected mirror is used only as back surface mirror, which unavoidably forms a double image due to the reflection on the surface and on the back.

A mirror having an aluminum coating is generally produced by forming an aluminum thin film by vacuum deposition or sputtering which requires a vacuum system. Further, because film formation takes time, the production efficiency is not so good. Therefore, the production cost tends to be high. Besides, the aluminum coating formed by the above-described method is not very durable, also needing a protective film.

JP-A-6-183787 discloses a method for producing a mirror having a reflectance of 70% or higher without using a vacuum system, in which a reflective layer and a reflection enhancing layer are deposited m sequence in an atmospheric pressure chemical vapor deposition (CVD) system. More specifically, the disclosure teaches that a high-refractive layer, such as a silicon layer, is formed as a reflective layer, and a low-refractive layer of silicon, etc. and a high-refractive layer of silicon, tin oxide, titanium oxide, etc are made thereon in sequence as refraction enhancing coatings.

On the other hand, prior arts for rendering the surface of a substrate, such as glass, hydrophilic to make it antifogging are disclosed in JP-A-9-278431, JP-A-9-295363, JP-A-10-36144, and JP-A-10-231146. Specifically, JP-A-9-278431 proposes forming a hydrophilic film of polyvinyl alcohol, etc on a substrate, the average surface roughness of the hydrophilic film ranging from 0.5 to 500 nm. JP-A-9-295363 teaches forming a titanium oxide layer or a tin oxide layer on a substrate, the average surface roughness of the oxide layer being 1 µm or more JP-A-10-36144 discloses forming a photocatalyst film of titanium oxide, etc. on a glass substrate and forming a porous inorganic oxide film of silicon oxide, etc. on the photocatalyst film. JP-A-10-231146 proposes forming an alkali-barrier and a photocatalyst film on a glass substrate, the average surface roughness of the photocatalyst layer falling within a range of from 1.5 to 800 nm.

Mirrors to be used under a humid condition, for example in a bathroom, are required to have high durability and excellent antifogging properties. It is easily conceivable that an antifogging mirror is obtained by forming a silver layer and a protective layer on the back side of a transparent substrate and rendering the surface side hydrophilic In this case, special edge treatment is required due to the poor durability of the silver coating as previously noted.

According to JP-A-6-183787 supra, a mirror having a silicon layer as the outermost layer exhibits satisfactory mirror characteristics owing to the high reflectance of the silicon layer but requires a protective film due to the poor durability of the silicon layer, and a mirror having a tin oxide or titanium oxide layer as the outermost layer exhibits satisfactory durability but has no hydrophilicity.

JP-A-9-278431, JP-A-9-295363, JP-A-10-36144, and JP-A-10-231146 supra all relate to a technique in which a substrate is provided with a hydrophilic coating, and the hydrophilicity is improved by making the surface of the hydrophilic coating have fine roughness. However, the problem of these techniques is that when the hydrophilic surface is cleaned with detergent, etc. to remove dirt, the surface is slow in restoring the hydrophilicity. A mirror in a bathroom easily gets dirty with soap, shampoo, toothpaste, and the like and should be cleaned with detergent frequently. If restoration of hydrophilicity takes time, fine water droplets tend to adhere to the surface before hydrophilicity is restored, resulting in reduction of the antifogging effect.

SUMMARY OF THE INVENTION

An object of the invention is to provide a hydrophilic and durable mirror having high visible light reflection which is easily cleaned and retains high hydrophilicity even after cleaning.

The object of the invention is accomplished by a hydrophilic mirror comprising a glass substrate having on one of the two main surface sides thereof (1) a layer having a refractive index n1 at 550 nm, (2) a layer having a refractive index n2 at 550 nm, (3) a tin oxide layer having a refractive index n3 at 550 nm, and (4) an overcoat in this order, the refractive indices n1, n2 and n3 satisfying the relationship: $n1 \geq n3 > n2$, and having a reflectance of 70% or more of visible light incident on the coated side.

According to the invention there is provided a front surface hydrophilic mirror having a visible light reflectance of 70% or more and, when cleaned with detergent, restores hydrophilicity in an extremely short time. Besides, the restored hydrophilicity lasts long. Protected with a durable overcoat, the mirrors of the invention are effectively used as hydrophilic mirrors, most conveniently in bathrooms.

DETAILED DESCRIPTION OF THE INVENTION

Figure 1:
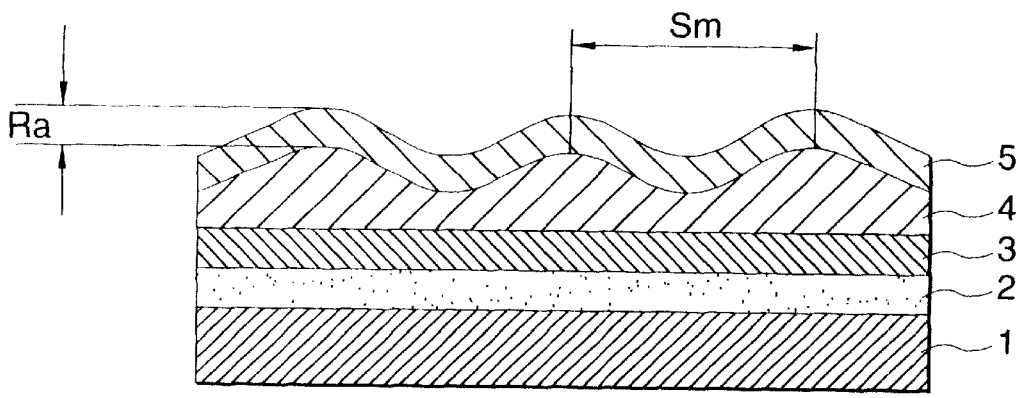
FIG. 1 is the cross section of a hydrophilic mirror according to the invention.

The hydrophilic mirror according to the invention has, on a glass substrate, (1) a layer having a refractive index n1 at 550 nm (hereinafter referred to as a layer (1)), (2) a layer having a refractive index n2 at 550 nm (hereinafter referred to as a layer (2)), (3) a tin oxide layer having a refractive index n3 at 550 nm (hereinafter sometimes referred to as a layer (3)), and (4) an overcoat in this order. Although formation of an overcoat on the tin oxide layer produces an adverse effect on reflection enhancement, resulting in slight reduction of reflectance, the above-described structure makes it possible to clean the mirror surface easily and yet to retain hydrophilicity after cleaning. Further, it is necessary to provide the tin oxide layer and the overcoat for obtaining a front surface mirror having satisfactory durability.

The layer (1) functions as a reflective layer, and the layers (2) and (3) serve for reflection enhancement. In order to secure such a high visible light reflectance as reaches at least 70%, the refractive indices of these layers at 550 nm should satisfy the relationship: $n1 \geq n3 > n2$. In this specification and claims, references to "refractive index" are intended to mean the refractive index for light of wavelength 550 nm.

Seeing that the tin oxide layer (3) has a refractive index n3 of approximately 2.0, it is preferred that n1 be 2.0 or more, and n2 be 1.8 or less. Because the visible light reflectance increases as the difference between n1 and n2 (n1–n2) becomes greater, it is preferred that n1 be as high as possible, and n2 be as low as possible.

In a highly preferred embodiment, the tin oxide layer (3) has a rutile structure. A coating of rutile tin oxide has moderate surface roughness which will be transferred to the surface of the overcoat provided thereon. As a result, the overcoat will have a fine surface profile that brings about further improved hydrophilicity.

The overcoat is preferably of at least one of silicon oxide, aluminum oxide, zirconium oxide, cerium oxide, and titanium oxide.

The content of silicon oxide in the overcoat is preferably 80% or more. The reason for this is that the overcoat becomes amorphous, making it possible to obtain a surface following up the shape thereunder, and the overcoat has a low refractive index, so that performance as a mirror is not impaired.

A tin oxide layer formed on a substrate with a certain surface roughness as an outermost layer can exert hydrophilicity as taught in JP-A-9-295363. In this case, however, once the surface is cleaned with bath soap, the contact angle with water is reduced to 70° to 80°. Where a tin oxide layer receives a thin overcoat of silicon oxide, etc. according to the invention, the water contact angle after cleaning is smaller than 10°. This is considered to be because a tin oxide layer and a silicon oxide layer are opposite in surface polarity, while bath soap is anionic, so that superhydrophilicity can result after cleaning.

The layer (1) preferably comprises silicon as a main component because, for one thing, silicon has a particularly high refractive index and, for another, it is readily deposited on a glass substrate by a thermal pyrolysis method The silicon layer may contain minor proportions of impurities, such as carbon, nitrogen, oxygen, etc. In this case, the refractive index n1 varies from 3.0 to 5.5 depending on the kind and amount of the impurity.

The layer (2) preferably comprises silicon oxide as a main component because silicon oxide has a low refractive index and can be formed with ease by a thermal pyrolysis method. The silicon oxide layer may contain minor proportions of impurities, such as nitrogen, carbon, fluorine, titanium, tin, aluminum, boron, phosphorus, etc. In this case, the refractive index n2 varies from 1.4 to 1.6 depending on the kind and amount of the impurity.

In a preferred modification, an undercoat can be provided between the layer (1) and the glass substrate. Where, in particular, soda-lime glass is used as a substrate, the undercoat prevents alkali diffusion to the layer (1) which may reduce the refractive index of the layer (1). It is possible to control the outermost surface profile by changing the surface unevenness of the undercoat.

The undercoat includes a tin oxide coating.

The tin oxide layer as the layer (3) having a refractive index n3 and the tin oxide layer as the undercoat may contain impurities, such as indium, fluorine, antimony, chlorine, carbon, silicone, etc.

The thickness of the undercoat is preferably 100 nm or smaller, more preferably 50 nm or smaller. As the undercoat gains in thickness, the haze increases to cause incident light to reflect irregularly, which impairs the function as a mirror.

The outermost roughness of the mirror preferably has a center-line average roughness (Ra) of 0.5 to 25 nm. Hydrophilicity is insufficient at an Ra smaller than 0.5 nm. As an Ra increases over 25 nm, the haze increases to cause incident light to reflect irregularly, which ruins the function as a mirror. Such a surface can be achieved by regulating the Ra of the tin oxide layer (3) within a range of 0.5 to 25 nm and transferring the roughness of the tin oxide layer (3) to the overcoat.

The outermost surface preferably has a mean spacing (Sm; the mean distance between profile peaks at the mean line) of 4 to 300 nm. The long-term stability of the hydrophilicity is low with an Sm smaller than 4 nm or larger than 300 nm. A still preferred Sm for improvement on long-term stability of hydrophilicity is 5 to 150 nm.

A method of indicating the center-line average roughness (Ra) uses an arithmetic mean roughness Ra defined in JIS B0601 (1994). The value (mn) of the arithmetic mean roughness is expressed "absolute value of deviation from the mean line", and is given by the following equation $$Ra = \frac{1}{L}\int_0^X |f(x)| dx$$

wherein L: Reference length

Further, similar to the center-line average roughness (Ra) described above, the mean spacing (Sm) is also defined by JIS B0601 (1994). That is, the mean spacing value (nm) between profile peaks is expressed "mean value of spacing of crest-valley one cycle obtained from intersection at which a course curve crosses the mean line", and is given by the following equation.

$$Sm = \frac{1}{n}\sum_{i=1}^{n} Smi$$

wherein Smi: Distance between profile peaks (mm)
   n: Number of distance between profile peaks within the reference length It is preferred that each layer has the following thickness.

Layer (1): 15 to 45 nm
Layer (2): 20 to 170 nm
Layer (3): 10 to 200 nm
Overcoat: 0.1 to 90 nm Where the thicknesses of the layers (1) and (2) are out of the above respective ranges, the visible light reflectance becomes lower than 70%. If the thickness of the tin oxide layer (3) is out of the above range, a desired surface roughness cannot be obtained, and the visible light reflectance becomes lower than 70%. If the overcoat is thinner than 0.1 nm, it is difficult to form a uniform overcoat If the overcoat is thicker than 90 nm, the Sm increases, failing to secure hydrophilicity retention, and the visible light reflectance becomes lower than 70%.

It is highly preferred that (i) each layer has the following thickness, and (ii) the reflection color is such that when defined by reference to the CIE LAB color scale system, $\sqrt{(a^{*2}+b^{*2})}$ is 0 to 10 so that the reflection color may approach a natural color.

Layer (1): 15 to 35 nm
Layer (2): 40 to 150 nm
Layer (3): 10 to 90 nm
Overcoat: 0.1 to 85 nm The hydrophilic mirror of the present invention has a visible light transmission of 30% or less, which permits use of the mirror as a half mirror. The uncoated back side of the glass substrate may be provided with an opaque film to obscure the back side image. The reflection color from the front surface can be controlled by the color of the opaque film.

The method for forming each constituting coating layers is not particularly limited and includes vacuum deposition, sputtering, a sol-gel method, a liquid phase precipitation method, baking, spraying, and CVD. A thermal pyrolysis method by spraying in which a raw material is sprayed on hot glass and pyrolyzed to form a coating by taking advantage of the heat of the hot glass and a CVD method are effective.

The glass substrate to be used is not particularly limited as long as a mirror is produced. Glass produced by a float process, such as soda-lime float glass, is preferred for productivity.

In applying coatings on hot glass, on-line coating (a system in which a raw material is supplied on the surface of glass while being supported on a molten salt in a float bath section or after having emerged from the bath) is preferred; for an extra heating system is not required, and coating over a wide area is possible. It is also possible to re-heat a previously formed glass plate for coating.

Coatings may also be formed by a combination of the above-described thermal pyrolysis method with other coating methods. For example, the layers (1), (2) and (3) are provided by the thermal pyrolysis method, and the overcoat is formed by a sol-gel method or sputtering.

Raw materials of a silicon layer formed by the thermal pyrolysis method include silane gases, such as monosilane and disilane, dichlorosilane, and silicon tetrachloride.

Raw materials of a silicon oxide layer formed by the thermal pyrolysis method include inorganic compounds, such as silane gases, e.g., monosilane and disilane, dichlorosilane, and silicon tetrachloride, and organic compounds, such as tetraethoxysilane, tetramethoxysilane, and dibutoxydiacetoxysilane as a silicon source; and oxygen, ozone, acetone, and carbon dioxide as an oxygen source. In using a silane gas, addition of ethylene, ethane, etc., is effective for stable formation of a silicon oxide layer.

For a tin oxide layer to be formed by the thermal pyrolysis method, raw materials include inorganic compounds, such as tin tetrachloride, and organic compounds, such as monomethyltin trichloride, monobutyltin trichloride, dimethyltin dichloride, dibutyltin dichloride, tetramethyltin, tetrabutyltin, dibutyltin diacetate, and dioctyltin diacetate.

Figure 2:
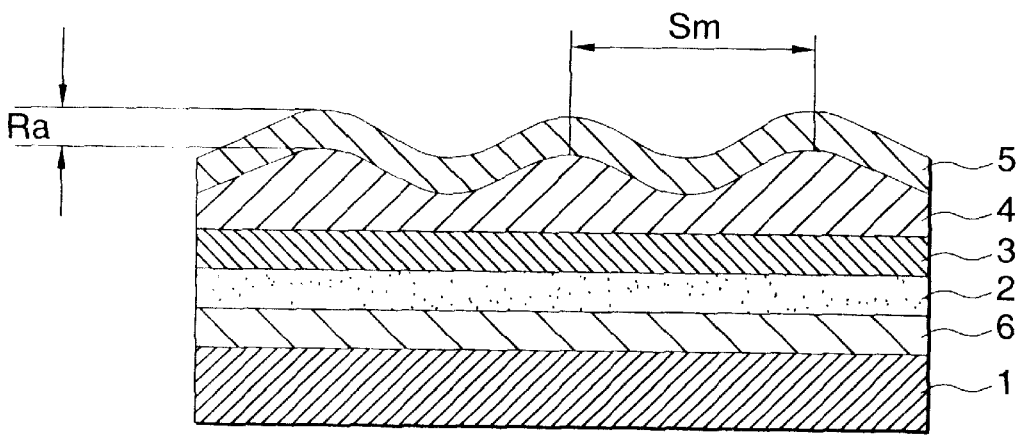
FIG. 2 is the cross section of another hydrophilic mirror according to the invention.
Figure 3:
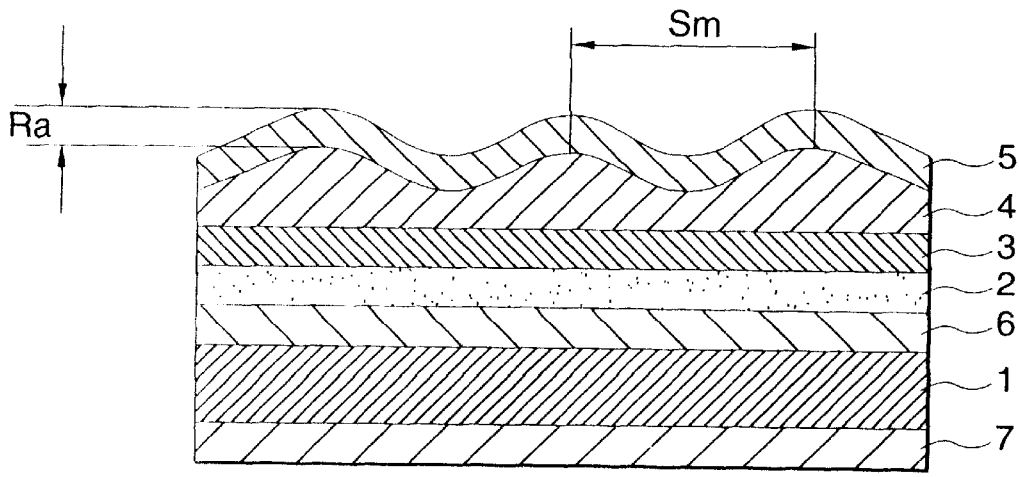
FIG. 3 is the cross section of still another hydrophilic mirror according to the invention.
Figure 4:
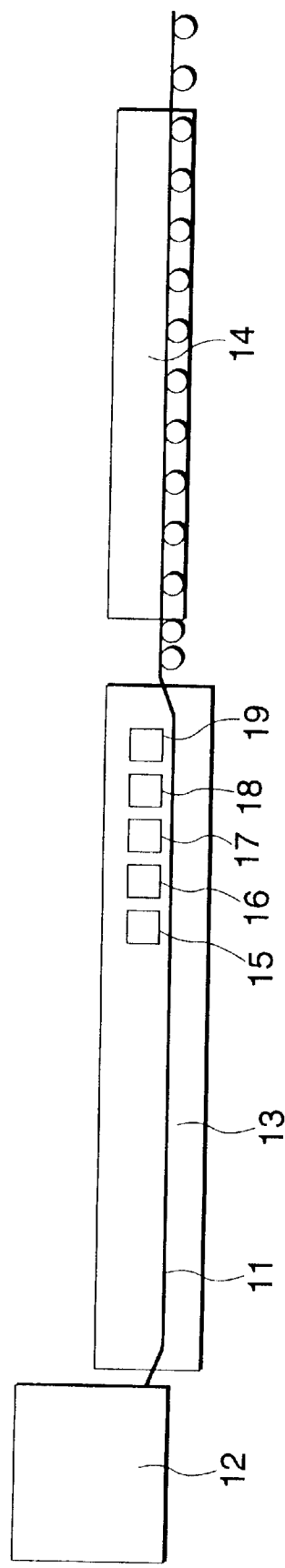
FIG. 4 is a diagram representing the arrangement of coating units on a float glass production line for production of mirrors according to the method of the invention.

The invention will now be illustrated in greater detail with reference to Examples and the accompanying drawings. FIGS. 1 to 3 each show an enlarged cross-sectional view of the front surface mirror of the invention. The mirror shown in FIG. 1 has, on a glass substrate 1, a silicon layer 2, a silicon oxide layer 3, a tin oxide layer 4, and a silicon oxide layer 5. In addition to the layer structure of FIG. 1, the mirror shown in FIG. 2 has an undercoat 6 between the glass substrate 1 and the silicon layer 2, and the mirror shown in FIG. 3 has an opaque layer 7 on the uncoated side of the glass substrate 1. FIG. 4 diagrams the on-line coating system in a float glass production line, which was adopted to carry out Examples, comprising a glass melting section 12, a float bath section 13 for forming the molten glass into a continuous ribbon, and a section 14 for annealing the glass ribbon.

Each of the coating layers were applied by pyrolytic CVD on glass 11 within a float bath 13 shown in FIG. 4. Coating was carried out after molten glass was formed into flat glass of prescribed thickness, i.e., while the glass was at a temperature ranging from 600 to 750° C. Coating units 15 to 19 for respectively applying coatings were set in the float bath section 13 at appropriate positions. Monosilane diluted with nitrogen was fed from the unit 16, monosilane diluted with nitrogen, ethylene, and oxygen were fed from the unit 17, dimethyltin dichloride diluted with nitrogen, oxygen, and water were fed from the unit 18, and monosilane diluted with nitrogen, ethylene, and oxygen were fed from the unit 19 to the surface of the glass 11 in this sequence to successively form a silicon layer 2, a silicon oxide layer 3, a tin oxide layer 4, and silicon oxide layer 5, respectively, to prescribed thicknesses. The thickness of each coating layer was adjusted by changing the concentrations of the raw materials. In Examples where an undercoat 6 was to be formed, dimethyltin dichloride diluted with nitrogen, oxygen, and water were fed to the glass 11 from the coating unit 15.

EXAMPLES 1 TO 7 AND 11 TO 14 AND COMPARATIVE EXAMPLES 1 TO 6

The coating units 16, 17, 18, and 19 were used to form successive silicon, silicon oxide, tin oxide, and silicon oxide layers on the glass surface. The coated glass was annealed in the lehr section 14, washed, and cut to prepare a hydrophilic mirror of 100 mm by 100 mm size.

EXAMPLES 8 AND 15

Hydrophilic mirror of 100 mm by 100 mm size was produced in the same manner as in the foregoing Examples, except that the coating units 15 to 19 were used to form successive tin oxide, silicon, silicon oxide, and tin oxide layers on the glass surface.

EXAMPLE 9

Mirror plate of 100 mm by 100 mm size was produced in the same manner as in the foregoing Examples, except that the coating units 15 to 18 were used to form successive tin oxide, silicon, silicon oxide, and tin oxide layers on the glass surface.

A silicon oxide layer was formed on the resulting mirror plate by a sol-gel method in a conventional manner to obtain a hydrophilic mirror.

EXAMPLE 10

Mirror substrate was produced in the same manner as in Example 9, and a silicon oxide layer was formed on the resulting mirror plate by sputtering in a conventional manner to obtain a hydrophilic mirror.

COMPARATIVE EXAMPLES 7 TO 9

Mirror of 100 mm by 100 mm size was produced in the same manner as in Examples 1, 4, and 6, except that the overcoat was not applied.

COMPARATIVE EXAMPLES 10 TO 11

Mirror of 100 mm by 100 mm size was produced in the same manner as in Examples 9 and 15, except that the overcoat was not applied.

While in the foregoing Examples and Comparative Examples all the layers except for the overcoat in Examples 9 and 10 were applied while the glass was in the float bath section 13, the oxide layers, i.e., a silicon oxide layer and a tin oxide layer, may be made in the lehr section 14. In such a case, the oxide layers can be formed by liquid or powder spray methods. Further, the overcoat may be formed by a sol-gel method or sputtering except for thermal decomposition CVD method of Examples 9 and 10.

The silicon layer 2, silicon oxide layer 3, tin oxide layer 4, silicon oxide layer 5, and undercoat 6 formed in Examples 1 to 15 had the following thickness. The reflectance of visible light incident on the coated side was 70% or more.

Undercoat 6 (tin oxide): 0 to 50 nm

Silicon layer 2: 15 to 45 nm

Silicon oxide layer 3: 20 to 170 nm

Tin oxide layer 4: 10 to 200 nm

Overcoat 5 (silicon oxide): 0.1 to 90 nm

Preferred ranges of the thicknesses were as follows. Where the thickness of each coating layer fell within the respective preferred range, the mirrors had not only a visible light reflectance of 70% or more but such a reflection color, when quantified in accordance with the CIE color coordinate system, that $\sqrt{(a^{*2}+b^{*2})}$ was in the range 0 to 10 so that the reflection color was imperceptible.

Undercoat 6 (tin oxide): 0 to 50 nm

Silicon layer 2: 15 to 35 nm

Silicon oxide layer 3: 40 to 150 nm

Tin oxide layer 4: 10 to 90 nm

Overcoat 5 (silicon oxide): 0.1 to 85 nm

The silicon layer 2, silicon oxide layer 3, and tin oxide layer 4 had the following refractive indices.

Silicon layer 2: 4.7

Silicon oxide layer 3: 1.46

Tin oxide layer 4: 2.0

In Examples 1 to 15, the tin oxide layer 4 had a rutile structure and an average surface roughness Ra of 0.5 to 25 nm and a mean spacing Sm of 4 to 300 mn. The silicon oxide layer 5 applied thereon also had an average surface roughness Ra of 0.5 to 25 nm and a mean spacing Sm of 4 to 300 nm because the roughness profile of the tin oxide layer 4 was transferred thereto.

Thus, the surface hydrophilic properties can be improved further by making a fine unevenness on the surface. That is, where the surface area is multiplied r times by the surface roughness, equation: $\cos\theta' = r\cos\theta\,(90°>\theta>\theta')$ is derived from Wenzel's formula, wherein $\theta$ is a contact angle with water on a smooth surface, and $\theta'$ is a contact angle with water on a roughened surface. For example, where a smooth surface having a contact angle of 30° with water is made rough to have its surface area increased by 10%, there is given a formula: $\cos\theta' = 1.1\cos 30° = 0.935$, from which $\theta$ is 17.7°. Similarly, an increase in surface area by 15% makes $\theta'$ 5.2°.

Where $\theta$ is 90° or greater, that is, where the surface is hydrophobic or water-repellent, an increase in surface area leads to an increase in $\theta$. In other words, to form fine unevenness makes a hydrophilic surface more hydrophilic and, on the contrary, makes a hydrophobic surface more hydrophobic.

Table 1 below shows the thickness of each coating layer, the reflectance of visible light incident on the coated side of the mirror, and the $\sqrt{(a^{*2}+b^{*2})}$ value of the reflected light in Examples 1 to 15 and Comparative is Examples 1 to 6. The visible light reflectance was measured with a spectrophotometer UV-3100 (Shimadzu Corp.) in accordance with JIS R 3106-1998. The reflection color was measured with UV-3100 in accordance with JIS Z 8722-1982, and chromaticness indices a* and b* according to the CIE LAB colorimetric system as specified in JIS Z 8729-1980 were calculated.

TABLE 1

| | Coating Thickness (nm) | | | | | | |
|---|---|---|---|---|---|---|---|
| | Overcoat 5 (silicon oxide) | Tin Oxide Layer 4 | Silicon Oxide Layer 3 | Silicon Layer 2 | Undercoat 6 (tin oxide) | Reflectance (%) | $\sqrt{(a^{*2}+b^{*2})}$ |
| Example 1 | 5 | 60 | 100 | 25 | | 81.2 | 9.0 |
| Example 2 | 25 | 60 | 100 | 15 | | 72.0 | 8.0 |
| Example 3 | 10 | 50 | 80 | 30 | | 77.8 | 7.5 |
| Example 4 | 10 | 90 | 40 | 25 | | 72.4 | 9.5 |
| Example 5 | 5 | 10 | 150 | 25 | | 70.1 | 9.1 |
| Example 6 | 50 | 10 | 110 | 25 | | 70.3 | 8.0 |
| Example 7 | 85 | 40 | 90 | 25 | | 70.2 | 6.3 |
| Example 8 | 10 | 60 | 90 | 25 | 10 | 80.7 | 7.1 |
| Example 9 | 10 | 60 | 90 | 25 | 50 | 75.9 | 7.1 |
| Example 10 | 10 | 60 | 70 | 35 | 45 | 71.8 | 9.9 |
| Example 11 | 5 | 70 | 80 | 45 | | 70.4 | 20.1 |
| Example 12 | 5 | 110 | 20 | 30 | | 70.4 | 20.8 |
| Example 13 | 5 | 120 | 30 | 30 | | 70.9 | 39.5 |
| Example 14 | 90 | 20 | 90 | 30 | | 70.1 | 19.1 |
| Example 15 | 10 | 200 | 90 | 30 | 5 | 77.5 | 42.1 |
| Comparative Example 1 | 20 | 60 | 100 | 10 | | 61.0 | 11.5 |
| Comparative Example 2 | 20 | 60 | 100 | 50 | | 58.0 | 19.6 |
| Comparative Example 3 | 20 | 60 | 10 | 25 | | 29.5 | 28.0 |
| Comparative Example 4 | 20 | 60 | 180 | 25 | | 45.0 | 39.9 |
| Comparative Example 5 | 20 | 130 | 100 | 25 | | 54.0 | 19.8 |
| Comparative Example 6 | 100 | 60 | 100 | 25 | | 67.3 | 3.4 |

It is seen from Table 1 that in Examples 1 to 15 the visible light reflectance was 70% or more. In Examples 1 to 10, the $\sqrt{(a^{*2}+b^{*2})}$ value was 10 or smaller. To the contrary, the visible light reflectance in Comparative Examples 1 to 6 was less than 70%.

Table 2 below shows the average surface roughness Ra, the mean spacing Sm and the change in contact angle with water before and after cleaning in Examples 1, 4, 6, 9, and 15 and Comparative Examples 7 to 11, which were the same as these Examples but had no overcoat.

TABLE 2

|  | Coating Thickness (nm) | | | | |  |  | Contact Angle with Water (°) | | |
| --- | --- | --- | --- | --- | --- | --- | --- | --- | --- | --- |
|  | Silicon Oxide Layer 5 | Tin Oxide Layer 4 | Silicon Oxide Layer 3 | Silicon Layer 2 | Tin Oxide Layer 6 | Ra (nm) | Sm | Immediately after Cleaning | 2 Hrs after Cleaning | 200 Hrs after Cleaning |
| Example 1 | 5 | 60 | 100 | 25 |  | 5 | 65 | 4 | 6 | 15 |
| Example 4 | 10 | 90 | 40 | 25 |  | 8 | 70 | 3 | 5 | 12 |
| Example 6 | 50 | 10 | 110 | 25 |  | 1 | 7 | 5 | 10 | 25 |
| Example 9 | 10 | 60 | 90 | 25 | 50 | 10 | 40 | 3 | 4 | 10 |
| Example 15 | 10 | 200 | 90 | 30 | 5 | 23 | 200 | 5 | 7 | 14 |
| Comparative Example 7 |  | 60 | 100 | 25 |  | 6 | 50 | 70 | 70 | 73 |
| Comparative Example 8 |  | 90 | 40 | 25 |  | 8 | 75 | 75 | 76 | 78 |
| Comparative Example 9 |  | 10 | 110 | 25 |  | 2 | 30 | 60 | 60 | 62 |
| Comparative Example 10 |  | 60 | 90 | 25 | 50 | 10 | 55 | 72 | 73 | 74 |
| Comparative Example 11 |  | 200 | 90 | 30 | 5 | 26 | 310 | 78 | 79 | 80 |

It is seem from the results in Table 2 that the mirrors according to the present invention have a water contact angle of not greater than 10° immediately after cleaning and retain the hydrophilicity for along period of time.

To the contrary, the comparative mirrors having no overcoat exhibit no hydrophilicity immediately from after cleaning, having a great contact angle with water, although they have substantially the same surface roughness as the corresponding mirrors of Examples.

While the invention has been described in detail and with reference to specific examples thereof, it will be apparent to one skilled in the art that various changes and modifications can be made therein without departing from the spirit and scope thereof.

What is claimed is:

1. A hydrophilic mirror comprising a glass substrate having on one of the two main surface sides thereof (1) a layer having a refractive index n1 at 550 nm, (2) a layer having a refractive index n2 at 550 nm, (3) a tin oxide layer having a refractive index n3 at 550 nm, and (4) an overcoat in this order, the refractive indices n1, n2, and n3 satisfying the relationship: n1≧n3>n2, and having a reflectance of 70% or more of visible light incident on the coated side, wherein said overcoat is of at least one of silicon oxide, aluminum oxide, zirconium oxide, cerium oxide, and titanium oxide.

2. A hydrophilic mirror according to claim 1, wherein said tin oxide layer (3) has a rutile structure.

3. A hydrophilic mirror according to claim 1, wherein said overcoat has a silicon oxide content of 80% or more.

4. A hydrophilic mirror according to claim 1, wherein said layer (1) having a refractive index n1 mainly comprises silicon.

5. A hydrophilic mirror according to claim 1, wherein said layer (2) having a refractive index n2 mainly comprises silicon oxide.

6. A hydrophilic mirror according to claim 1, which further has an undercoat between said glass substrate and said layer (1) having a refractive index n1.

7. A hydrophilic mirror according to claim 6, wherein said undercoat is a tin oxide layer.

8. A hydrophilic mirror according to claim 1, wherein the outermost surface profile on the coated side has a center-line average roughness Ra of 0.5 to 25 nm.

9. A hydrophilic mirror according to claim 8, wherein the tin oxide layer (3) having a refractive index n3 has a center-line average surface roughness Ra of 0.5 to 25 nm.

10. A hydrophilic mirror according to claim 1, wherein the outermost surface on the coated side has a mean spacing Sm of 4 to 300 nm between profile peaks at a mean line, and further wherein Sm is defined by JIS B0601-1994.

11. A hydrophilic mirror according to claim 1, wherein said layer (1) having a refractive index n1 has a thickness of 15 to 45 nm, said layer (2) having a refractive index n2 has a thickness of 20 to 170 nm, said layer (3) having a refractive index n3 has a thickness of 10 to 200 nm, and said overcoat has a thickness of 0.1 to 90 nm.

12. A hydrophilic mirror according to claim 11, wherein said layer (1) having a refractive index n1 has a thickness of 15 to 35 nm, said layer (2) having a refractive index n2 has a thickness of 40 to 150 nm, said layer (3) having a refractive index n3 has a thickness of 10 to 90 nm, said overcoat has a thickness of 0.1 to 85 nm, and the reflection color of light incident on the coated side is such that when defined by reference to the CIE LAB color scale system specified in JIS Z 8729-1980, $\sqrt{(a^{*2}+b^{*2})}$ is 0 to 10.

13. A hydrophilic mirror according to claim 1, which further has an opaque layer on the uncoated back side thereof.

14. A method of producing a hydrophilic mirror comprising forming on the main surface side of a glass substrate (1)

a layer having a refractive index n1 at 550 nm, (2) a layer having a refractive index n2 at 550 nm, (3) a tin oxide layer having a refractive index n3 at 550 nm, and (4) an overcoat in this order, the refractive indices n1, n2, and n3 satisfying the relationship: n1≧n3>n2, and said overcoat being of at least one of silicon oxide, aluminum oxide, zirconium oxide, cerium oxide, and titanium oxide.

15. A method of producing a hydrophilic mirror according to claim 14, which further comprises forming an undercoat between said glass substrate and said layer having a refractive index n1.

16. A method of producing a hydrophilic mirror according to claim 4, wherein said layer having a refractive index n1, said layer having a refractive index n2, and said tin oxide layer having a refractive index n3 are formed by thermal pyrolysis on hot glass.

* * * * *